Aug. 2, 1949.   O. YADOFF   2,477,947
METHOD AND DEVICE FOR PROJECTING POWDERS
CARRYING ELECTROSTATIC CHARGES
Filed Aug. 24, 1945
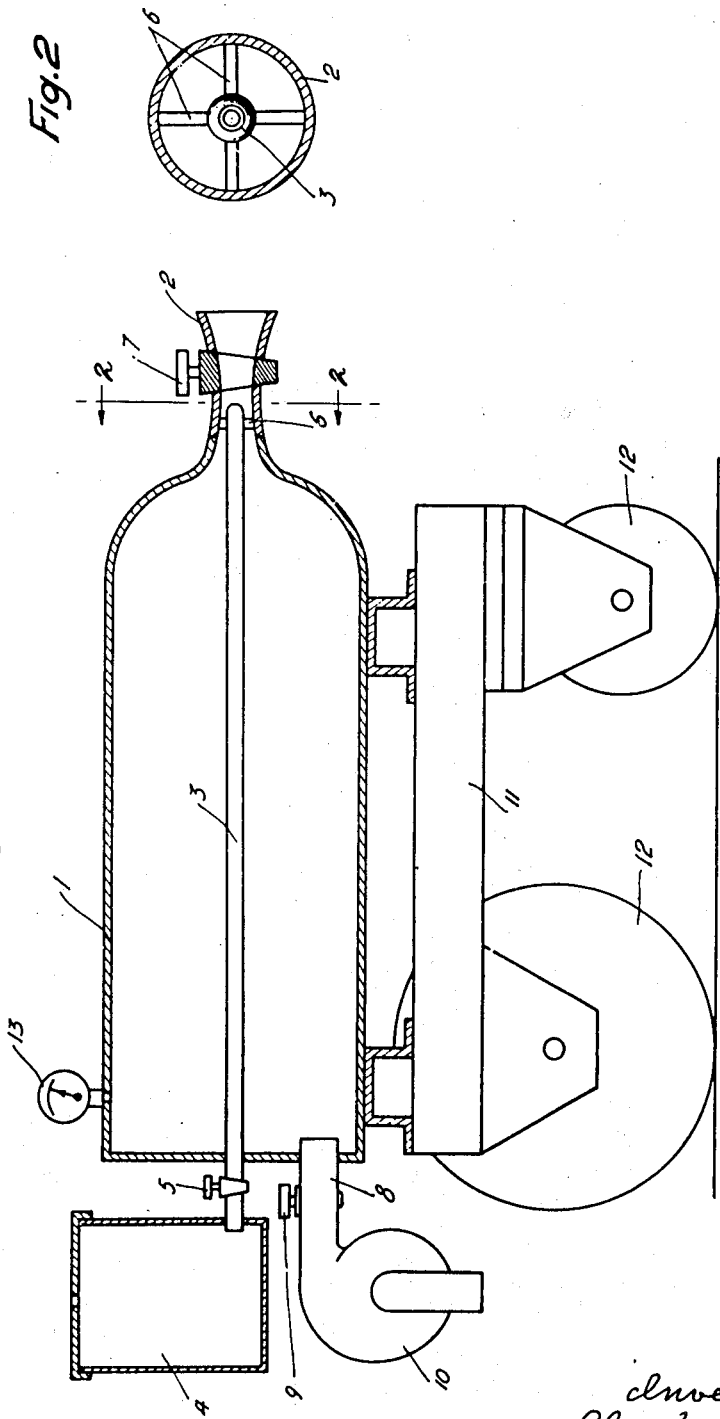
Inventor:
Oleg Yadoff,
By his attorneys
Baldwin & Wight Patented Aug. 2, 1949

2,477,947

UNITED STATES PATENT OFFICE 2,477,947

METHOD AND DEVICE FOR PROJECTING POWDERS CARRYING ELECTROSTATIC CHARGES

Oleg Yadoff, Versailles, France, assignor to Electronic Dusting Corporation, New York, N. Y., a corporation of New York Application August 24, 1945, Serial No. 612,490
In France January 30, 1945

6 Claims. (Cl. 47—1.3)

The present invention concerns a method and a device for spraying pulverulent matters, in which the powder grains are electrostatically loaded simultaneously with their spraying.

According to the invention the powder to be sprayed is driven through a convergent-divergent nozzle by means of an air current flowing with a super-sound speed or a speed greater than that of sound in a gaseous medium.

It has indeed been found that powder grains as well as water or steam globules carried along in the above mentioned conditions are electrified by friction with the air or gaseous medium in an appreciable manner, which is not the case when the driving air current possesses a speed which is lower than that of the sound.

This method finds a particularly interesting application in the spraying of insect-killing or anti-cryptogamic powders on plants. It is well known, indeed, that it is very difficult to cause such powders to adhere to the leaves and stalks of the plants when the hitherto known spraying methods are used. More particularly, it is practically impossible to cover by spraying the lower face of the leaves. Furthermore, a large quantity of powder is generally lost through dispersion and dissipation. On the contrary, by using the method according to the invention, the electrified powder grains sprayed in the direction of a plant are immediately attracted irrespectively of the sign of their load by the said plant which forms a conductor system connected with the earth and having, therefore, a potential zero. Thus, the leaves, more particularly, are covered with an even adhering layer as well on their lower as on their upper faces.

The device according to the invention, adapted to carry out the above described method, chiefly comprises a convergent-divergent nozzle connected with a source of compressed air and into the axis of which opens, in the neighborhood of the neck of the nozzle, a tube of a small diameter connected with a vessel adapted for containing the powder to be sprayed.

The compressed air source connected with the nozzle can be formed of a reservoir fed by a compressor.

The powder feeding tube, made of an insulating or non-insulating material, can be maintained in the axis of the nozzle by radially extending partition walls.

A form of execution of a device according to the invention is shown by way of example in the appended drawing, in which:

Fig. 1 is a diagrammatical longitudinal sectional view of said device, and

Fig. 2 is a cross-sectional view of the spraying nozzle, on a larger scale.

The device as shown comprises a metallic reservoir 1 of an elongated shape adapted for withstanding an internal pressure and connected at one of its ends with a convergent-divergent nozzle 2. Into the axis of said nozzle 2 opens the tapered end of a tube 3 of a small diameter extending right through the reservoir 1 and connected outside the latter with a vessel 4 containing the powder to be sprayed, a shut-off cock 5 being interposed on said tube 3. Radially extending supporting arms 6 maintain the end of the tube 3 centered in the nozzle 2 and a cock 7 of the casing-type the opening of which has a profile corresponding exactly to that of the nozzle makes it possible to shut off the latter.

The reservoir 1 is connected, on the other hand, by means of a piping 8 on which a cock 9 is interposed with a compressor 10 driven by an electric motor, not shown.

The whole unit is mounted on a frame 11 provided with wheels 12 which facilitate its displacement during its use for spraying powders onto plants.

The working of the device is as follows. The cocks 5 and 7 are first closed, the cock 9 is opened, and the compressor 10 is started. When the desired pressure is attained inside the reservoir, said pressure being determined as a function of the characteristic features of the nozzle 2 by the well known formula of Saint-Venant as hereinafter explained, with a view to obtain a super-sound speed for the air in the neck of the nozzle, the cock 9 is closed again. The pressure in the reservoir is indicated by a pressure-gauge 13. The formula known in France as the Saint-Venant formula is the equation which governs the flowing of a compressible fluid, or represents the expression of velocities in function of pressures for super-sonic flow. This formula appears in Aerodynamics of a Compressible Fluid, by Hans Wolfgang Liepman and Allen E. Puckett, 1947, at page 32. The formula as used in connection with applicant's process is as follows:

$$v = \sqrt{\frac{2\gamma}{\gamma-1}\frac{Pa}{\rho a}\left[\left(\frac{Po}{Pa}\right)^{\frac{\gamma-1}{\gamma}} - 1\right]}$$

where $v$ = velocity of gas $\gamma$ = ratio $\dfrac{\text{specific heat of gas at constant pressure}}{\text{specific heat of gas at constant volume}} = \dfrac{C\rho}{Cv}$ $Pa$ = final pressure out of nozzle
$\rho a$ = final density of gas out of nozzle
$Po$ = initial or high pressure of gas The cocks 5 and 7 are then opened and one obtains in the nozzle an air jet having a super-sound speed which carries along the powder supplied by the tube 3, the grains of said powder being simultaneously electrified and violently thrown off outside.

The electrical charge of the sprayed particles varies with their nature. Thus, wheat-flour introduced into the apparatus has been charged positively while flowers of sulphur have been charged negatively. The introduction of small traces of steam through tube 3 makes it possible to obtain negative or positive charges according to the quantity which has been introduced.

I claim:

1. A method of spraying insecticide powders and simultaneously imparting to them an electrostatic charge which consists in introducing particles of said powder into an air current traveling at a speed higher than that of sound in a gaseous medium.

2. A method of spraying insecticide powders and simultaneously imparting to them an electrostatic charge which consists in introducing particles of said powder into an air current traveling through a convergent-divergent passageway at a speed higher than that of sound in a gaseous medium.

3. A device for spraying powders, consisting of a convergent-divergent nozzle connected with a compressed air source, the pressure in said air source being so related to the nozzle characteristics that the speed of the air at the neck of the nozzle is higher than the speed of sound in air, and a tube having a small diameter connected with a vessel adapted to contain the powder to be sprayed, said tube opening in the axis and in the neighborhood of the neck of said nozzle.

4. A method for the biological treatment of vegetation, wherein finely divided minute biologically active particles are distributed and caused to adhere to the surfaces under treatment, which method comprises introducing said particles into an air current travelling at a speed higher than that of sound in a gaseous medium, whereby an electrostatic charge is imparted to said particles, and spraying said charged particles onto the surfaces to be treated.

5. A method for the biological treatment of vegetation, wherein finely divided minute biologically active particles are distributed and caused to adhere to the surfaces under treatment, which method comprises mixing said particles with a stream of air and imparting to said mixture a speed higher than that of sound in a gaseous medium, whereby said particles are electrostatically charged, and spraying said charged particles onto the surfaces to be treated.

6. A method for the biological treatment of vegetation, wherein finely divided minute biologically active particles are sprayed through a nozzle and caused to adhere to the surfaces under treatment, which method comprises discharging a stream of air with said particles entrained therein, through said nozzle at a speed higher than that of sound in a gaseous medium, whereby an electrostatic charge is imparted to said particles.

OLEG YADOFF.

REFERENCES CITED

The following references are of record in the file of this patent:

UNITED STATES PATENTS

| Number | Name | Date |
| --- | --- | --- |
| 563,829 | Wilbraham | July 14, 1896 |
| 817,819 | Walkup | Apr. 17, 1906 |
| 825,381 | Coleman | July 10, 1906 |
| 1,723,955 | Shepherd et al. | Aug. 6, 1929 |
| 1,749,504 | Pelton | Mar. 4, 1930 |
| 2,297,726 | Stephanoff | Oct. 6, 1942 |
| 2,302,185 | Campbell | Nov. 17, 1942 |
| 2,302,289 | Bramston-Cook | Nov. 17, 1942 |
| 2,396,533 | Root | Mar. 12, 1946 |

OTHER REFERENCES

Pauthenier, "Electricite. Sur le poudrage . . .," published 1944 in Comptes Rendus, Academie des Sciences, vol. 219, pp. 613 and 614.